United States Patent
McGee et al.

(10) Patent No.: US 9,185,359 B1
(45) Date of Patent: Nov. 10, 2015

(54) ENTERPRISE-WIDE CAMERA DATA

(71) Applicant: Target Brands, Inc., Minneapolis, MN (US)

(72) Inventors: Christopher Michael McGee, Minneapolis, MN (US); Robert F. Foster, Ramsey, MN (US)

(73) Assignee: Target Brands, Inc., Minneapolis, MN (US)

( * ) Notice: Subject to any disclaimer, the term of this patent is extended or adjusted under 35 U.S.C. 154(b) by 331 days.

(21) Appl. No.: 13/868,673

(22) Filed: Apr. 23, 2013

(51) Int. Cl.
*H04N 7/18* (2006.01)

(52) U.S. Cl.
CPC ........................... *H04N 7/181* (2013.01)

(58) Field of Classification Search
CPC ................. H04N 7/181; H04N 7/18
USPC ................................. 348/187, 159
See application file for complete search history.

(56) References Cited

U.S. PATENT DOCUMENTS

| | | | |
|---|---|---|---|
| 7,671,728 B2 | 3/2010 | Buehler | |
| 7,825,792 B2 | 11/2010 | Buehler | |
| 8,013,729 B2 | 9/2011 | Buehler | |
| 8,184,157 B2 | 5/2012 | Mittal | |
| 2006/0223488 A1 | 10/2006 | Rambaud | |
| 2007/0279214 A1 | 12/2007 | Buehler | |
| 2007/0282665 A1 | 12/2007 | Buehler et al. | |
| 2007/0283004 A1 | 12/2007 | Buehler | |
| 2008/0007720 A1 | 1/2008 | Mittal | |
| 2008/0077510 A1 | 3/2008 | Dielemans | |
| 2008/0303903 A1* | 12/2008 | Bentley et al. | 348/143 |
| 2008/0306787 A1 | 12/2008 | Hamilton et al. | |
| 2009/0033747 A1* | 2/2009 | Chambers | 348/187 |
| 2010/0145899 A1 | 6/2010 | Buehler | |
| 2010/0171826 A1 | 7/2010 | Hamilton et al. | |

FOREIGN PATENT DOCUMENTS

WO 2006028368 A1 3/2006

\* cited by examiner

*Primary Examiner* — Michael Lee
(74) *Attorney, Agent, or Firm* — Merek, Blackmon & Voorhees, LLC (57) ABSTRACT

A status of each camera in a plurality of facilities is requested and is stored in memory. Cameras in different facilities are grouped and for each group, a measure of a quantity of cameras in the group that are not operational is determined based on the status stored for each camera. A user interface is generated that recommends moving all cameras in a group to a new location in each respective facility if the measure of the quantity of cameras that are not operational in the group exceeds a threshold.

19 Claims, 12 Drawing Sheets

| LOCATION | FAILURE RATE | MOVE CAMERAS |
|---|---|---|
| LOADING DOCK | 38% | YES |
| RESTAURANT | 35% | YES |
| FRONT ENTRANCE | 32% | YES |
| FRONT EXIT | 31% | YES |
| BACKROOM DOOR | 22% | NO |
| JEWELRY | 8% | NO |

CAMERA MOVEMENT RECOMMENDATIONS

402 — ENTERPRISE-WIDE CAMERA USAGE

| LOCATION | AVERAGE VIEWS | SCALED VIEWS | REMOVE |
|---|---|---|---|
| KITCHEN | 0.2 | 1.6 | YES |
| FURNITURE | 0.3 | 2.4 | YES |
| INTIMATE APPAREL | 2.3 | 18.4 | YES |
| TOYS/GAMES | 4.1 | 32.8 | NO |
| GROCERY | 4.3 | 34.4 | NO |
| ELECTRONICS | 7.7 | 61.6 | NO |
| JEWELRY | 8.5 | 68 | NO |
| BOOKS/MUSIC | 10.3 | 82.4 | NO |
| HEALTHCARE | 11.2 | 89.6 | NO |
| INFANT/TODDLER | 12.5 | 100 | NO |

CAMERA MOVEMENT RECOMMENDATIONS

| LOCATION | FAILURE RATE | MOVE CAMERAS |
|---|---|---|
| LOADING DOCK | 38% | YES |
| RESTAURANT | 35% | YES |
| FRONT ENTRANCE | 32% | YES |
| FRONT EXIT | 31% | YES |
| BACKROOM DOOR | 22% | NO |
| JEWELRY | 8% | NO |

ENTERPRISE-WIDE CAMERA DATA

BACKGROUND

Within a retail store, a security camera system typically consists of multiple cameras connected to a computer network. Many security cameras contain processors and memory that allow the camera to store images locally on the camera or to transmit the images through the network to be stored on one or more servers that are connected to the network. The servers may be located within the store or may be located at a remote location.

Viewing applications are also available that allow a user to find stored videos for a particular camera in the network. Such viewing applications can either interrogate the individual cameras for their stored videos or interrogate a video storage controller that stores video for multiple cameras. Some viewing applications allow a user to monitor images being captured by multiple cameras in the store at the same time.

The discussion above is merely provided for general background information and is not intended to be used as an aid in determining the scope of the claimed subject matter. The claimed subject matter is not limited to implementations that solve any or all disadvantages noted in the background.

SUMMARY

A status of each camera in a plurality of facilities is requested and is stored in memory. Cameras in different facilities are grouped and for each group, a measure of a quantity of cameras in the group that are not operational is determined based on the status stored for each camera. A user interface is generated that recommends moving all cameras in a group to a new location in each respective facility if the measure of the quantity of cameras that are not operational in the group exceeds a threshold.

A computing device includes a processor requesting a status of each camera in a facility and a memory receiving and storing each camera status. The processor determines a measure of how many cameras in the facility are not operational and generates a user interface indicating an operational soundness of the facility based on the measure of how many cameras in the facility are not operational.

A computer-implemented method involves grouping cameras from multiple buildings into groups and for each group, determining a distribution of time periods between when video is captured by cameras and when it is viewed. For each group, a processor sets in memory a cache overwrite time that designates when a video from a camera in the group may be overwritten in a memory based on the distribution for the group.

A storage medium has computer-executable instructions stored thereon that when executed by a processor cause the processor to group cameras from multiple buildings into groups and for each group, determine an average number of times images from cameras in the group have been viewed over a chosen period of time. The processor generates a user interface that recommends removing cameras from a location in all of the multiple buildings based on the average number of times images from cameras in a group were viewed over the chosen period of time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

In the embodiments described below, viewing data and status information for cameras across an enterprise are used to identify cameras that should be removed from facilities throughout the enterprise, to identify cameras that should be moved to new locations in facilities throughout the enterprise, to set memory parameters for storing video from cameras throughout the enterprise and to identify the operational soundness of facilities within the enterprise.

Figure 1:
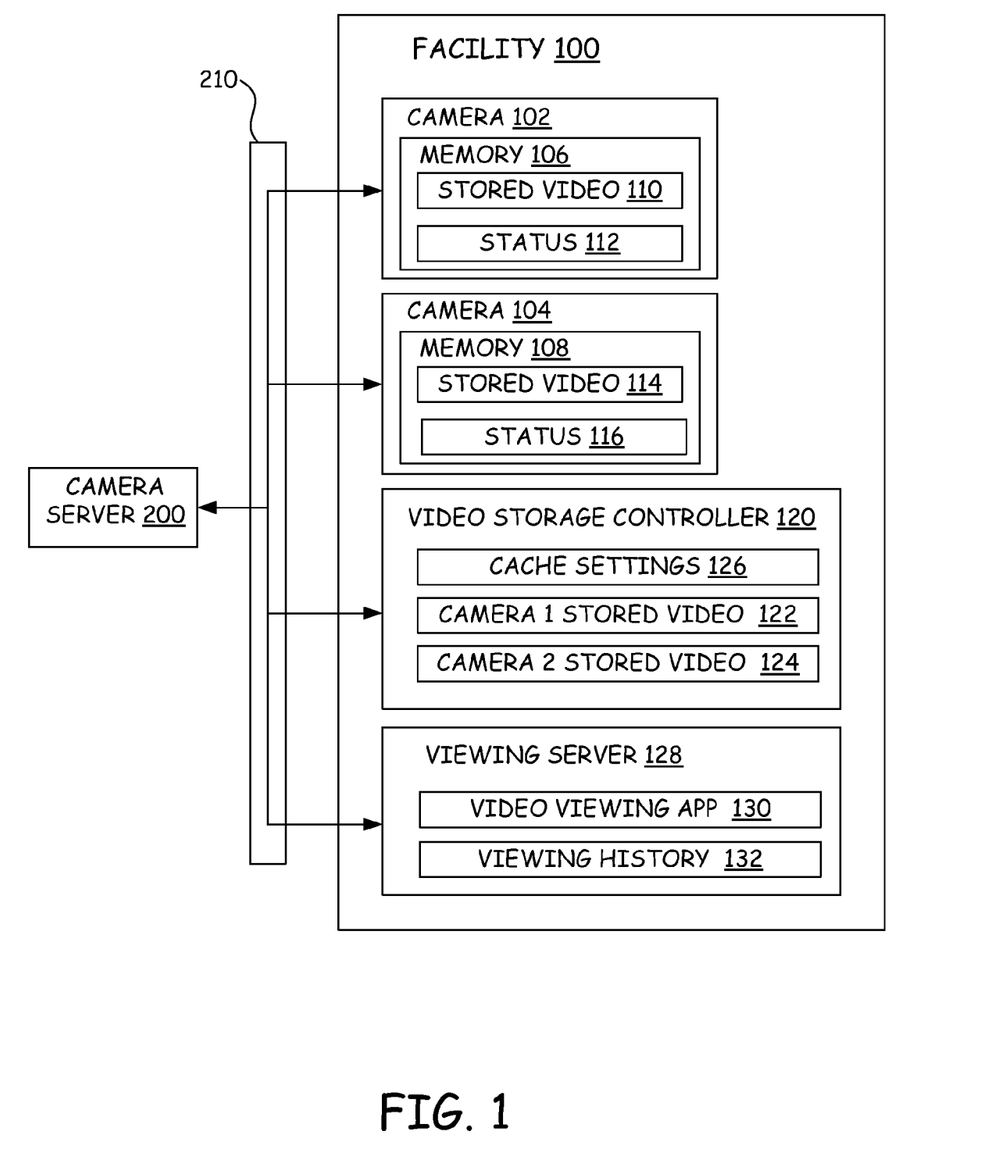
FIG. 1 provides a block diagram of elements within a facility in accordance with one embodiment.

FIG. 1 provides a block diagram of a facility or building 100 containing multiple cameras, which are exemplified by cameras 102 and 104 in FIG. 1. Those skilled in the art will recognize that although only two cameras are shown in FIG. 1, any number of cameras may be present in facility 100. Each camera includes a memory such as memory 106 of camera 102 and memory 108 of camera 104. Each camera's memory stores images and video captured by the camera. For example, memory 106 holds stored video 110 and memory 108 holds stored video 114. In addition, each memory may include a current status of the camera such as status 112 in memory 106 and status 116 in memory 108. Example values for the status can include "on", "off", and "non-operational." Further, the status may take the form of an error code when the camera is non-operational that shows the error being experienced by the camera such as a faulty image sensor, or a faulty memory.

Facility 100 may also include a video storage controller 120 that can be used to store video from each of the cameras within facility 100 to reduce the memory requirements of the individual cameras and to centralize the recorded video to simplify searching for stored video. Thus, video storage controller 120 can include stored video for each of the cameras such as camera 1 stored video 122 and camera 2 stored video 124, which respectively represent video from camera 102 and camera 104. Note that when video storage controller 120 is provided in facility 100, video does not need to be stored locally on each camera and instead can be stored on video storage controller 120. Video storage controller 120 also includes cache settings 126, which define how memory in video storage controller 120 is utilized. In particular, cache settings 126 assign memory space to each camera in facility 100 and also assign overwrite times, which represent the amount of time a video is stored on video storage controller 120 before it can be overwritten with a new video. By establishing overwrite times, cache settings 126 reduce the amount of memory that is needed since older videos are overwritten instead of being stored in parallel with new videos. Cache settings 126 can set different memory space values and different overwrite time values for each camera in facility 100.

Facility 100 may also include a viewing server 128 that includes a video viewing application 130 and a viewing history 132. Video viewing application 130 may be called from a client device either within facility 100 or remote from facility 100. Video viewing application 130 allows the user to access stored videos either in video storage controller 120 or in one of the cameras such as cameras 102 and 104. In addition, video viewing application 130 allows the user to select a particular camera and a particular time and day during which the stored video was captured. In accordance with some embodiments, video viewing application 130 allows a user to also view current images being captured by the cameras such as camera 102 and 104.

When a video is viewed using viewing application 130, the information about the video that was viewed is stored in a viewing history 132 on viewing server 128. Viewing history 132 includes an identification of the camera, the time and date stamp of the video that was being viewed, the time and date that the viewing took place, and the user who viewed the video.

Although video viewing application 130 and viewing history 132 are shown to be on viewing server 128 in the embodiment of FIG. 1, in other embodiments, viewing application 130 and viewing history 132 may be stored on video storage controller 120 or on a server that is remote from facility 100.

Figure 2:
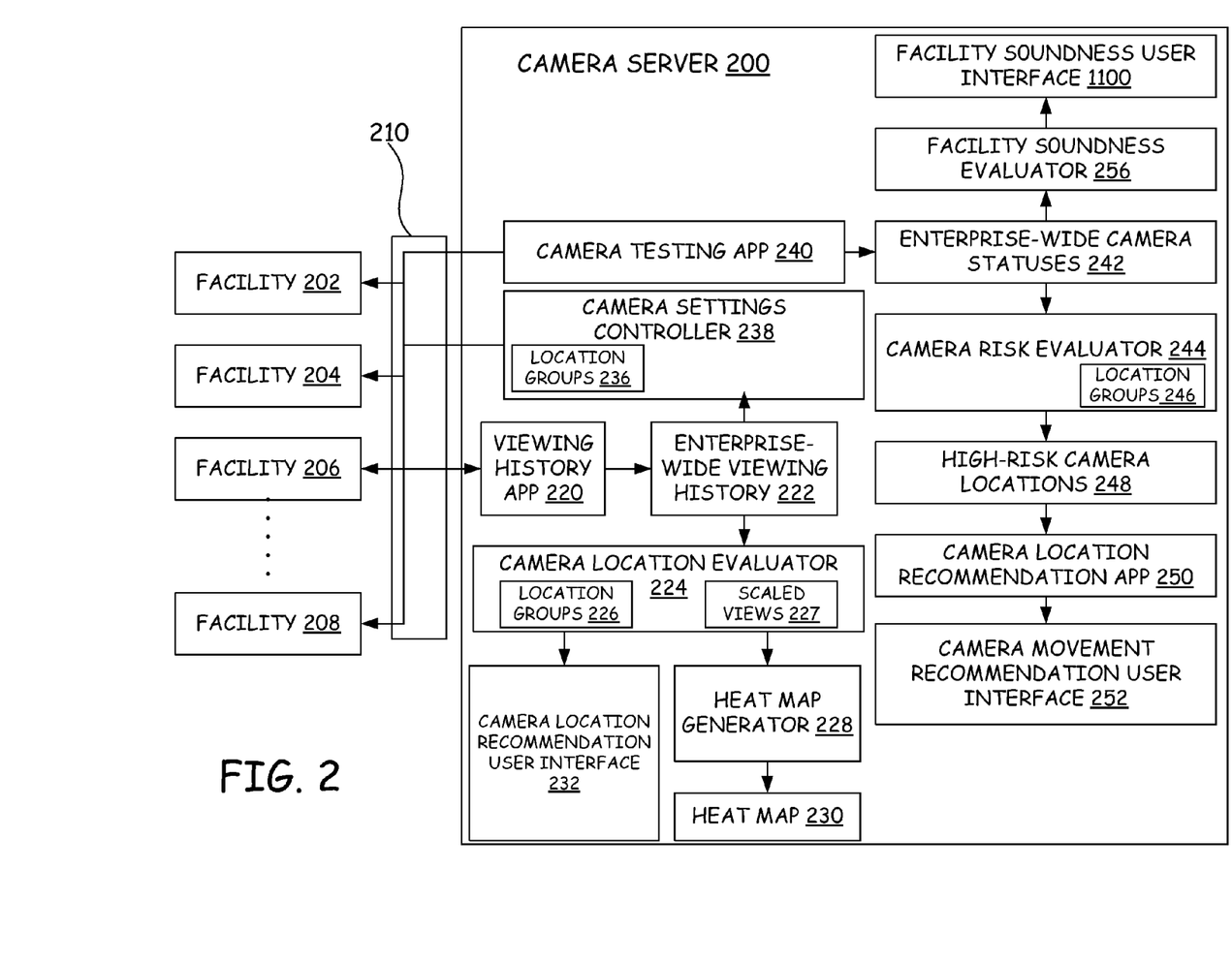
FIG. 2 provides a block diagram of elements of a camera system in accordance with one embodiment.

FIG. 2 provides a block diagram of a camera system that includes a camera server 200 and a collection of facilities or buildings 202, 204, 206, and 208, which are each part of a single enterprise. In accordance with most embodiments, each of facilities 202, 204, 206 and 208 contains the elements shown in facility 100 of FIG. 1. An example of an enterprise containing such facilities is a retail corporation containing a number of different retail stores. Facilities 202, 204, 206 and 208 communicate with camera server 200 across a network 210, which may be constructed from multiple local area networks and wide area networks such as the Internet.

In accordance with some embodiments, camera server 200 is used to identify nonessential camera locations across an enterprise. A nonessential camera location is one that produces videos that are not viewed often enough to warrant having a camera in that location. For enterprises that have multiple facilities, cameras may be positioned in the same location in each facility. Thus, identifying nonessential camera locations across an enterprise involves identifying nonessential camera locations that are common to multiple facilities in the enterprise.

Figure 3:
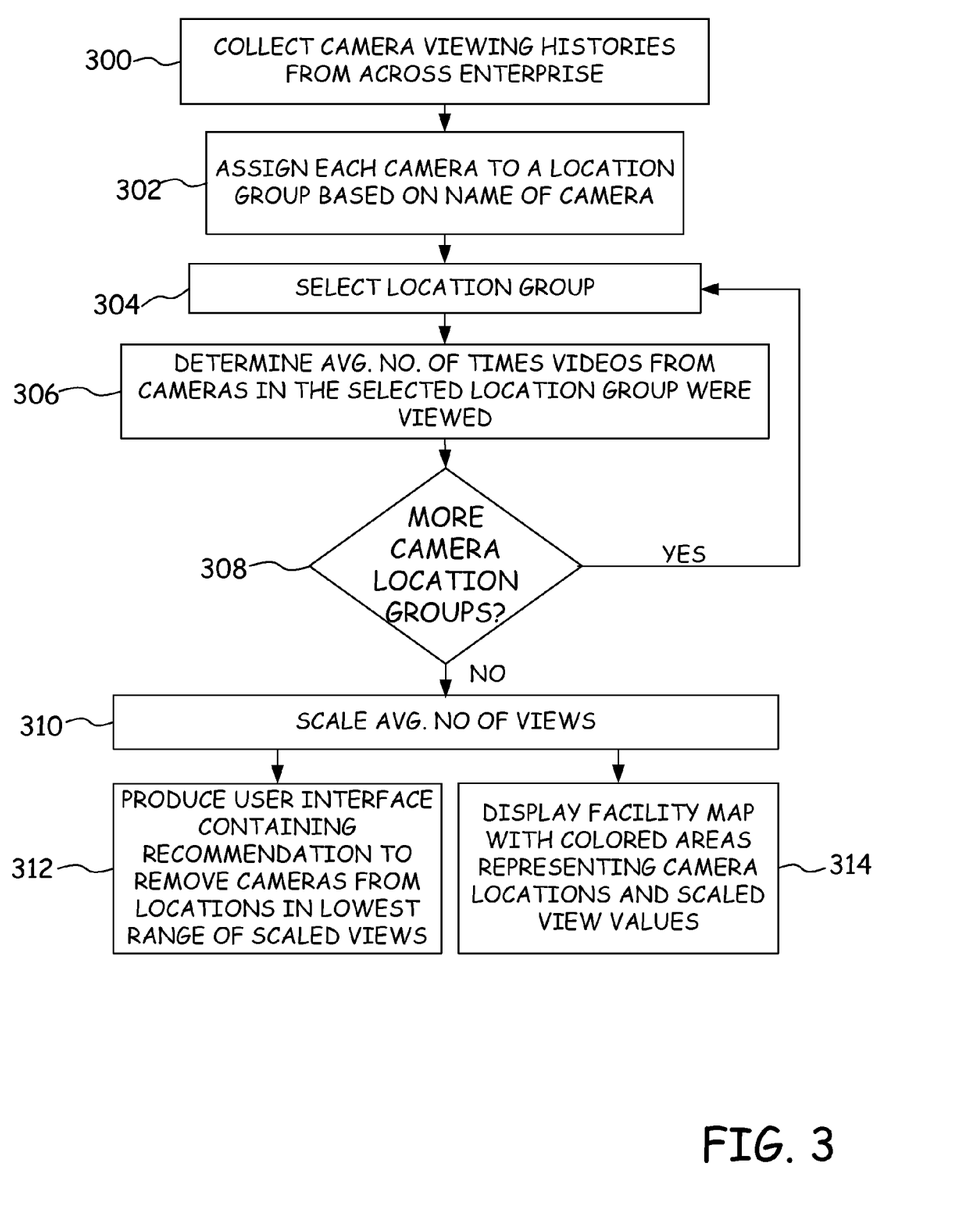
FIG. 3 provides a flow diagram of a method of generating a user interface containing a recommendation to remove cameras from locations.

FIG. 3 provides a flow diagram in accordance with one embodiment for identifying nonessential camera locations. In step 300 of FIG. 3, a viewing history application 220 of FIG. 2 collects camera viewing histories from across the enterprise. In particular, viewing history application 220 accesses a viewing history, such as viewing history 132 of FIG. 1, stored in each facility. Viewing history 132 indicates the time and date that videos from each camera in a facility were viewed. Viewing history application 220 stores the collected viewing histories as enterprise-wide viewing history 222 in FIG. 2, with each viewing history indexed by a camera name for the camera that captured the video and a facility identifier for the facility that houses the camera.

At step 302, a camera location evaluator 224 assigns each camera in enterprise-wide viewing history 222 to a location group based on the camera's name. This results in location groups 226. In accordance with some embodiments, each camera is given a name that corresponds to the area covered by the camera. For example, a camera that records images of an electronics area would be named "electronics." In alternative embodiments, the camera names are less descriptive of the area such as "N236." In accordance with one embodiment, camera location evaluator 224 assigns cameras to location groups based on commonalities in the names. For example, all cameras with "electronic" in their names are grouped together. In other embodiments, camera location evaluator 224 uses a predefined list of camera names for each location group such that if a camera's name is on the list of names for a group, camera location evaluator 224 places the camera in that location group. The predefined list of camera names is generated so that the different names for cameras that cover identical locations in facilities of the enterprise are associated with a single location group. For example, one group may consist of cameras with names such as "grocery," "food," "dry goods," and "produce." By forming such location groups, cameras in the same location at different facilities are grouped together into a common location group.

At step 304, a location group from location groups 226 is selected by camera location evaluator 224. At step 306, camera location evaluator 224 accesses enterprise-wide viewing history 222 for the cameras in the selected location group. Camera location evaluator 224 then determines an average number of times video from cameras in the selected location group were viewed over a set period of time, such as a year. For example, the number of times each camera in the selected location group was viewed are summed together and divided by the total number of cameras in the location group to produce the average. This average is then stored for the selected location group.

At step 308, camera location evaluator 224 determines if there are more camera location groups in location groups 226. If there are more location groups, the process returns to step 304 where a new location group is selected and step 306 is repeated for the new location group.

When all of the location groups have been processed at step 308, the average number of views for each location group is scaled so the maximum scaled value is 100 at step 310. In accordance with one embodiment, this scaling involves dividing the largest average number of views by 100 to produce a scaling factor and dividing each of the number of average views by the scaling factor to produce a scaled views value. The scaled view values for the location groups are stored in memory as scaled views 227. Scaling the values provides a consistent range of scaled values such that the scaled values are not impacted by the period over which the average number of views is calculated.

Figure 4:
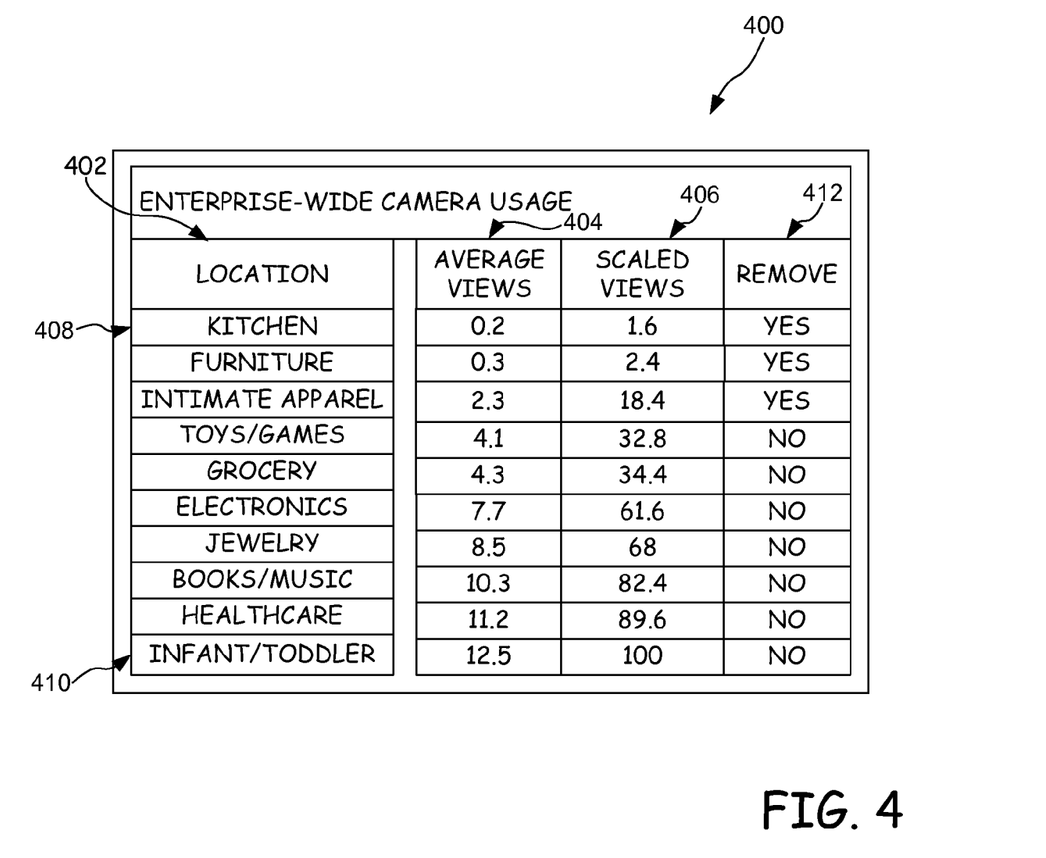
FIG. 4 provides an example of a user interface providing a recommendation to remove cameras from locations.

At step 312, camera location evaluator 224 produces a user interface containing recommendations to remove cameras from locations in a lowest range of scaled values. The lowest range of scaled values can be set using a threshold of scaled values such that any scaled values below the threshold is considered to be in the lowest range. For example, cameras with scaled views values below 20 are considered to be in the lowest range and therefore are recommended to be removed in accordance with one embodiment. User interface 400 represents an example of such a user interface and includes a location column 402 that contains the names of the location groups, an average views column 404 that contains the average number of views, a scaled views column 406 that contains scaled views values, and removal column 412 that includes a recommendation to either remove cameras from a location or maintain the cameras in that location. For example, in row 408, the "kitchen" location group is shown to have an average number of views of 0.2, a scaled views value of 1.6, and a recommendation to remove cameras from this location. Similarly, row 410 provides entries for the "infant/toddler" location group with an average number of views of 12.5, a scaled views value of 100, and a recommendation to maintain the cameras at this location.

The recommendation to remove a camera can indicate that the camera should be removed from that location in all of the facilities 202, 204, 206 and 208 or can be a recommendation to remove the camera from that location in future facilities but not existing facilities. By removing cameras from facilities, data storage requirements for security video can be reduced and the time required to search through store video can be lessened because there will be less video to review.

The recommendation to remove a camera from a location is made based on the viewing history from multiple facilities. As a result, a recommendation to remove a camera from a location may be made even if video from that camera is viewed often for one or more of the facilities. For example, in a particular facility, the camera in the kitchen location may be viewed on average 12.5 times, an amount equal to the average number of camera views for the infant/toddler location. However, since this only occurs in a single facility and the recommendation is made based on enterprise-wide use of cameras in the kitchen location, the viewing history of the camera in this single facility may not be enough to keep the camera from being removed from the facility. Thus, the decision to remove a camera is made based on enterprise-wide camera use data instead of on an individual-facility basis.

At step 314, in addition to displaying user interface 400 or as an alternative to displaying user interface 400, a heat map generator 228 generates a heat map 230 that consists of a generic facility map with colored areas representing camera locations and scaled views values.

Figure 5:
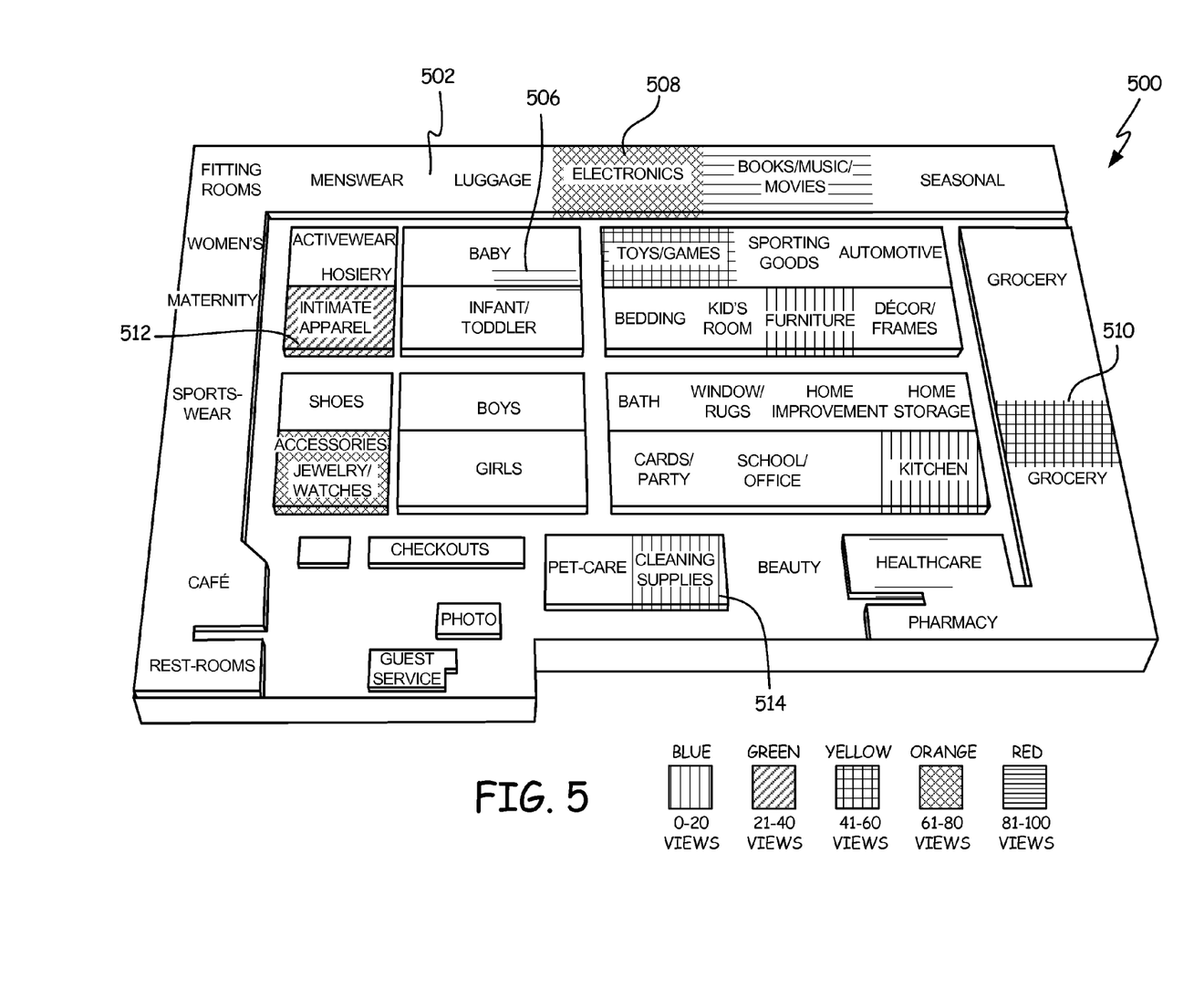
FIG. 5 provides a heat map of enterprise-wide camera viewing.

FIG. 5 provides an example of a heat map 500 in accordance with an embodiment in which the facilities are stores. Heat map 500 includes a generic store map 502. Generic store map 502 does not necessarily represent the layout of any one individual facility, such as facilities 202, 204, 206 and 208. Instead, generic store map 502 includes the locations or areas common to each of the facilities 202, 204, 206 and 208 and provides one example of how these locations or areas may be distributed across a store. In different facilities, the locations or areas may be in different positions within the store and the store may have a different overall geometry. To produce heat map 230, heat map generator 228 associates each location group 226 formed by camera location evaluator 224 with a position on store map 502.

Heat map generator 228 uses scaled views 227 for each location group to identify a color to assign to the area of store map 502 associated with the location. In accordance with one embodiment in which the scaled views have values from 0-100, scaled views from 0-20 are assigned the color blue, scaled views from 21-40 are assigned the color green, scaled views from 41-60 are assigned the color yellow, scaled views 61-80 are assigned the color orange, and scaled views 81-100 are assigned the color red. For example, in FIG. 5, infant/toddler location 506 is shaded with a red color, electronics area 508 is shaded with an orange color, grocery area 510 is shaded with a yellow color, intimate apparel area 512 is shaded with a green color and cleaning supplies area 514 is shaded with a blue color. Note that in FIG. 5, only selected areas have been shown as being colored for clarity. In actual implementations, more of the store is covered by cameras and as such more areas would be colored.

By using scaled views values instead of the average number of views, a consistent mapping between the colors and the scaled views values can be used that differentiates the relative viewing histories of different camera locations. The scaled views values can alternatively be interpreted as relative frequencies with which images from groups of cameras are viewed. Under this interpretation, the heat map has color-coded areas that indicate the relative frequency with which images from groups of cameras are viewed. Specifically, each color-coded area represents an area covered by a group of cameras and the color coding indicates the relative frequency with which images from the group of cameras are viewed.

Figure 6:
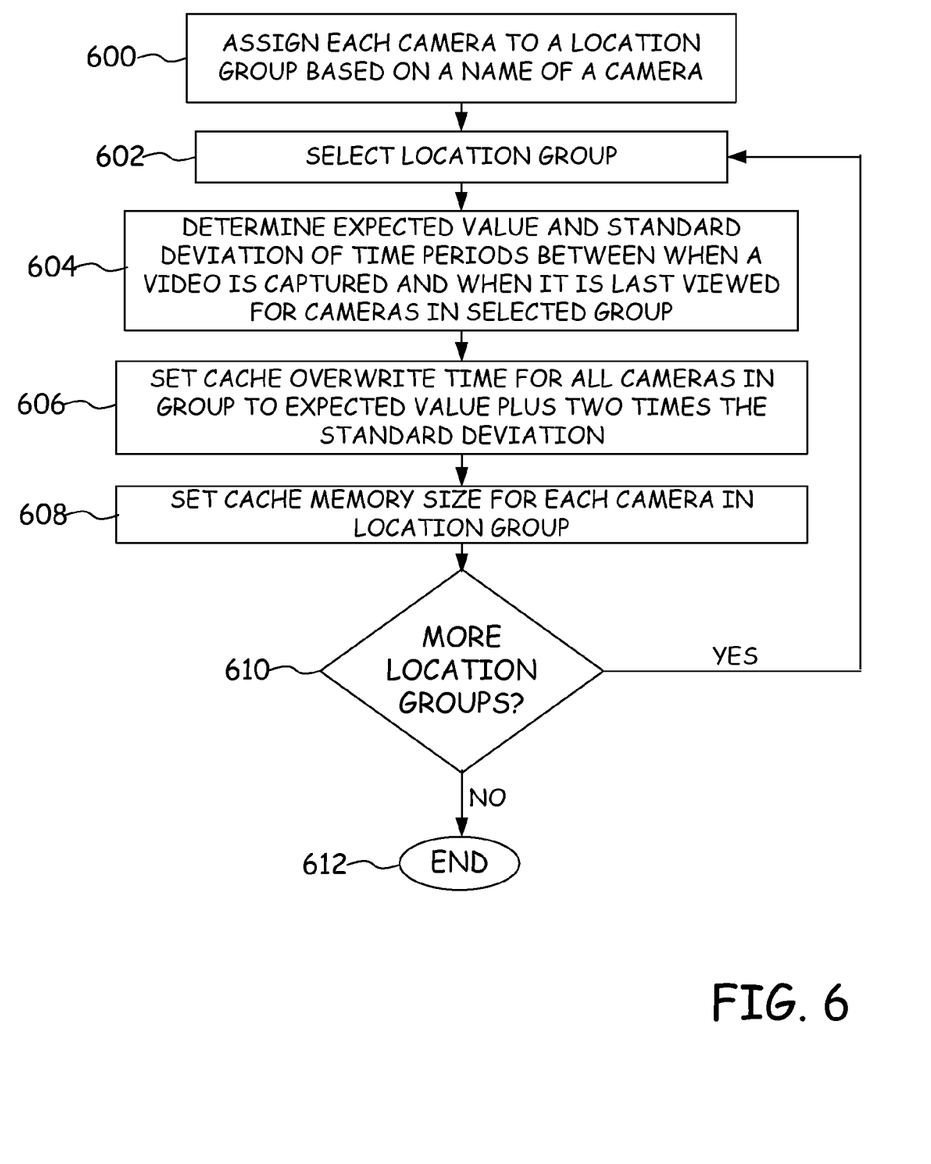
FIG. 6 provides a flow diagram of a method of setting cache parameters for cameras across an enterprise.

In accordance with a further embodiment, the enterprise-wide viewing history 222 is used to set memory parameters for storing video. FIG. 6 provides a flow diagram of one method of setting video memory parameters in an enterprise.

At step 600, each camera is assigned to a location group 236 by a camera settings controller 238. In accordance with some embodiments, each camera is given a name that corresponds to the area covered by the camera. For example, a camera that records images of an electronics area would be named "electronics." In alternative embodiments, the camera names are less descriptive of the area such as "N236." The names of the cameras are stored in enterprise-wide viewing history 222. In accordance with one embodiment, camera settings controller 238 assigns cameras to location groups based on commonalities in the names. For example, all cameras with "electronic" in their names are grouped together. In other embodiments, camera settings controller 238 uses a predefined list of camera names for each location group such that if a camera's name is on the list of names for a group, camera settings controller 238 places the camera in that location group. The predefined list of camera names is generated so that the different names for cameras that cover identical locations in facilities of the enterprise are associated with a single location group. For example, one group may consist of cameras with names such as "grocery," "food," "dry goods," and "produce." By forming such location groups, cameras in the same location at different facilities are grouped together into a common location group.

At step 602, camera settings controller 238 selects a location group and at step 604 determines an expected value and a standard deviation of storage periods for videos of cameras in the selected group. A storage period for a video is the length of time between when video was captured and when it was last viewed. To determine the expected value, viewing histories for each video of each camera in the group are retrieved to identify the length of time between when the video was captured and when the video was last viewed. Those time periods are then summed together for all videos of all of the cameras in the location group and the sum is divided by the total number of videos associated with the location group. To compute the standard deviation, the square root of the average square difference between each period of time and the expected value is determined.

At step 606, all the cameras in the location group have their cache overwrite time set to the expected value time plus two times the standard deviation. The overwrite time is the period of time that a video can reside in memory before it is overwritten with a newer video. By setting the overwrite time to the expected value time plus two times the standard deviation, it is expected that 95% of the videos captured by the cameras in the location group will have their overwrite times set such that the videos can be viewed when desired but are overwritten after the last expected viewing of the video.

The cache overwrite time set in step 606 can be set by communicating with the individual cameras such as cameras 102 and 104 of FIG. 1 such that the memory parameters for the onboard memory in the camera are changed to reflect the new cache overwrite times. In accordance with other embodiments, cache settings such as cache settings 126 in a video storage controller such as video storage controller 120 are changed to set the overwrite times for the stored videos from the cameras. For example, cache settings 126 can be changed to alter the overwrite time for camera 1 stored video 122. Because the location group includes cameras from multiple facilities, setting the cache overwrite time for all cameras in the group involves setting the cache overwrite time for cameras in multiple different facilities. In particular, the overwrite times of all of the cameras in a location group are set to the same value even though the cameras are located in different facilities.

At step 608, camera setting controller 238 sets cache memory sizes for each camera in the selected location group. In accordance with one embodiment, the cache memory size is set based on the cache overwrite time and the camera data collected for the camera during that overwrite time. Thus, the cache memory size is set so that it is large enough to accommodate all the video that will be acquired during the cache overwrite time. In accordance with one embodiment, the cache memory size is set within each camera assigned to the location group. In accordance with other embodiments, the cache memory size is set in cache settings 126 of video storage controller 120 in each facility to set the cache storage size for stored videos such as camera 1 stored video 122. This results in an efficient allocation of memory within video storage controller 120 and can reduce the overall memory requirements of video storage controller 120.

At step 610, camera settings controller 238 determines if there are more location groups in location groups 236. If there are more location groups, a new location group is selected at step 602, and steps 604, 606 and 608 are repeated for the cameras in the newly selected location group. After all of the location groups have been processed at step 610, the process ends at step 612.

Figure 7:
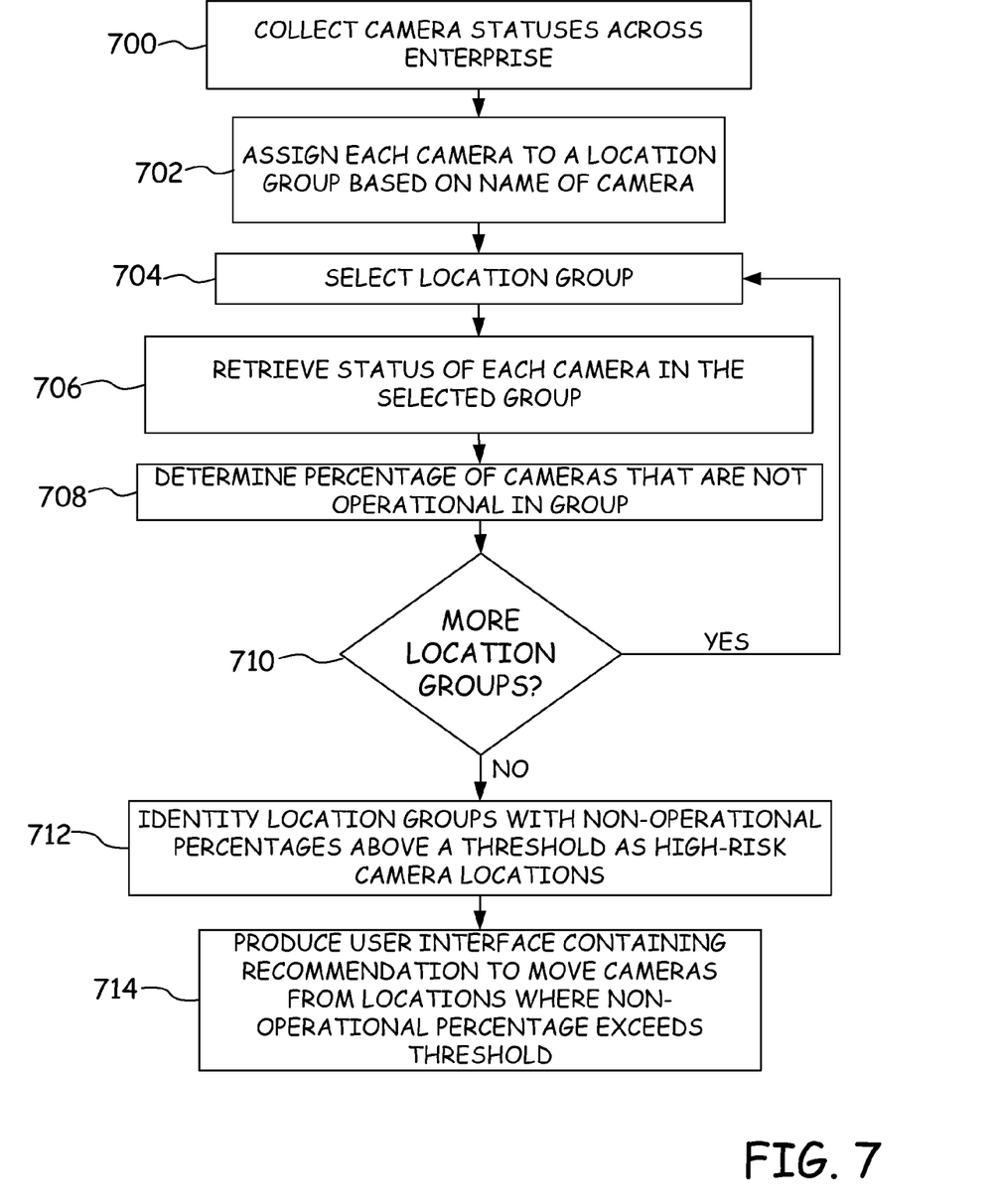
FIG. 7 provides a flow diagram of a method of recommending moving cameras from locations based on operational status data.

In accordance with a further embodiment, a current status of cameras throughout an enterprise can be used to recommend moving cameras from certain locations. FIG. 7 provides a flow diagram of one method of making such recommendations. In step 700, a camera testing application 240 collects the status of every camera across an enterprise. The statuses are stored as enterprise-wide camera statuses 242. In accordance with one embodiment, the status of a camera may be retrieved directly from the camera by submitting a request over a network to the camera for its status. Such status information is stored within the camera, for example as status 112 in camera 102 of FIG. 1 and status 116 in camera 104 of FIG. 1. If the camera testing application 240 is unable to establish communication with the camera over the network, camera testing application 240 sets the camera status as "not operational."

At step 702, a camera risk evaluator 244 assigns each camera to a location group 246. In accordance with one embodiment, the cameras are assigned to location groups based on the names given to the cameras in each of the facilities. In accordance with some embodiments, each camera is given a name that corresponds to the area covered by the camera. For example, a camera that records images of an electronics area would be named "electronics." In alternative embodiments, the camera names are less descriptive of the area such as "N236." In accordance with one embodiment, camera risk evaluator 244 assigns cameras to location groups based on commonalities in the names. For example, all cameras with "electronic" in their names are grouped together. In other embodiments, camera risk evaluator 244 uses a predefined list of camera names for each location group such that if a camera's name is on the list of names for a group, camera risk evaluator 244 places the camera in that location group. The predefined list of camera names is generated so that the different names for cameras that cover identical locations in facilities of the enterprise are associated with a single location group. For example, one group may consist of cameras with names such as "grocery," "food," "dry goods," and "produce." By forming such location groups, cameras in the same location at different facilities are grouped together into a common location group.

At step 704, camera risk evaluator 244 selects a location group and at step 706, camera risk evaluator 244 retrieves a status of each camera in the selected group from enterprise-wide camera statuses 242. At step 708, camera risk evaluator 244 determines a measure of the quantity of cameras that are not operational in the selected location group. The measure may be a count of the cameras that are not operational in the selected location group or the percentage of cameras that are not operational in the selected location group, for example. The measure of the quantity of cameras that are not operational is then stored for the location group.

At step 710, camera risk evaluator 244 determines if there are more location groups in location groups 246 and if there are more location groups, returns to step 704 to select a new location group. Camera risk evaluator 244 then repeats step 706 and 708 for the newly selected location group. When there are no more location groups at step 710, camera risk evaluator 244 identifies those location groups with non-operational measures above a threshold at step 712. In accordance with one embodiment, the threshold has been set at 30% non-operational cameras. The location groups with non-operational percentages above the threshold are then identified as being associated with high-risk camera locations 248. For example, if more than 30% of cameras in a location group are not operational, the locations associated with the location group are identified as being high-risk camera locations.

At step 714, a camera location recommendation application 250 generates a camera movement recommendation user interface 252 that recommends moving cameras from locations identified as high-risk camera locations 248.

Figure 8:
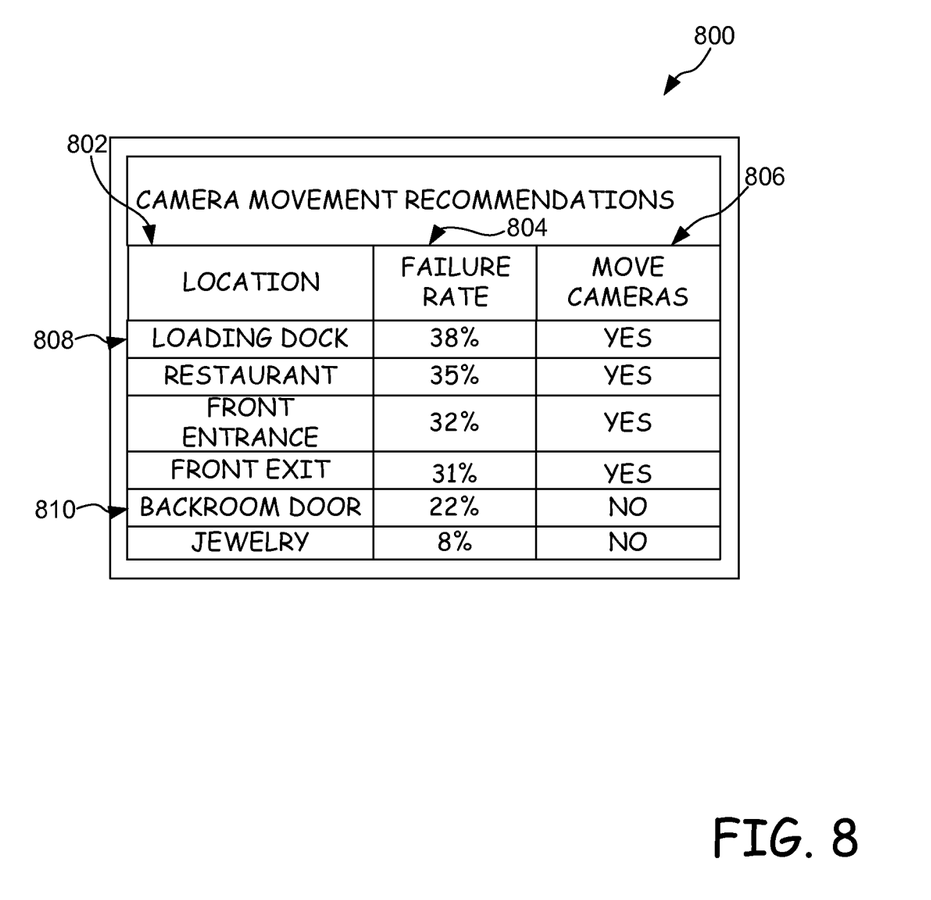
FIG. 8 provides an example of a user interface recommending moving cameras in an enterprise.

FIG. 8 provides an example of a user interface 800 that consists of a location column 802, a failure rate column 804 and a move camera recommendation 806. Location column 802 contains the name of the location group such as "loading dock," "restaurant," "front entrance," "front exit," "backroom door" and "jewelry." The name of the location group can be the name of all of the cameras assigned to the location group or a name for an area covered by the cameras in the location group. Thus, the location group name "loading dock" can also be the name of the cameras that provide coverage of the loading dock. Failure rate column 804 indicates the percentage of non-operational cameras in each location group and move cameras recommendation 806 indicates whether the cameras in the location should be moved to a new location because of the failure rate. For example, in row 808, recommendation user interface 800 recommends that cameras in the loading dock location should be moved because their failure rate is 38%. This indicates that the current locations for cameras on loading docks across the facilities result in a large number of non-operational cameras either due to weather conditions or some other interference with the camera. In accordance with one embodiment, the recommendation to move cameras is a recommendation to move cameras that are operational as well as those that are not operational.

In row 810, user interface 800 indicates that cameras positioned at the backroom door have a failure rate of 22% but are not recommended to be moved. Thus, even though some of the cameras have become non-operational in some of the facilities, user interface 800 does not recommend moving those cameras.

In accordance with a further embodiment, the enterprise-wide camera statuses 242 can be used to provide a user interface indicating the operational soundness of facilities. The operational soundness of a facility is the degree to which the facility follows established operational guidelines such as employee hiring guidelines, employee training guidelines, facility cleanliness guidelines, facility safety guidelines, facility accounting guidelines, and facility stocking guidelines, for example.

Figure 9:
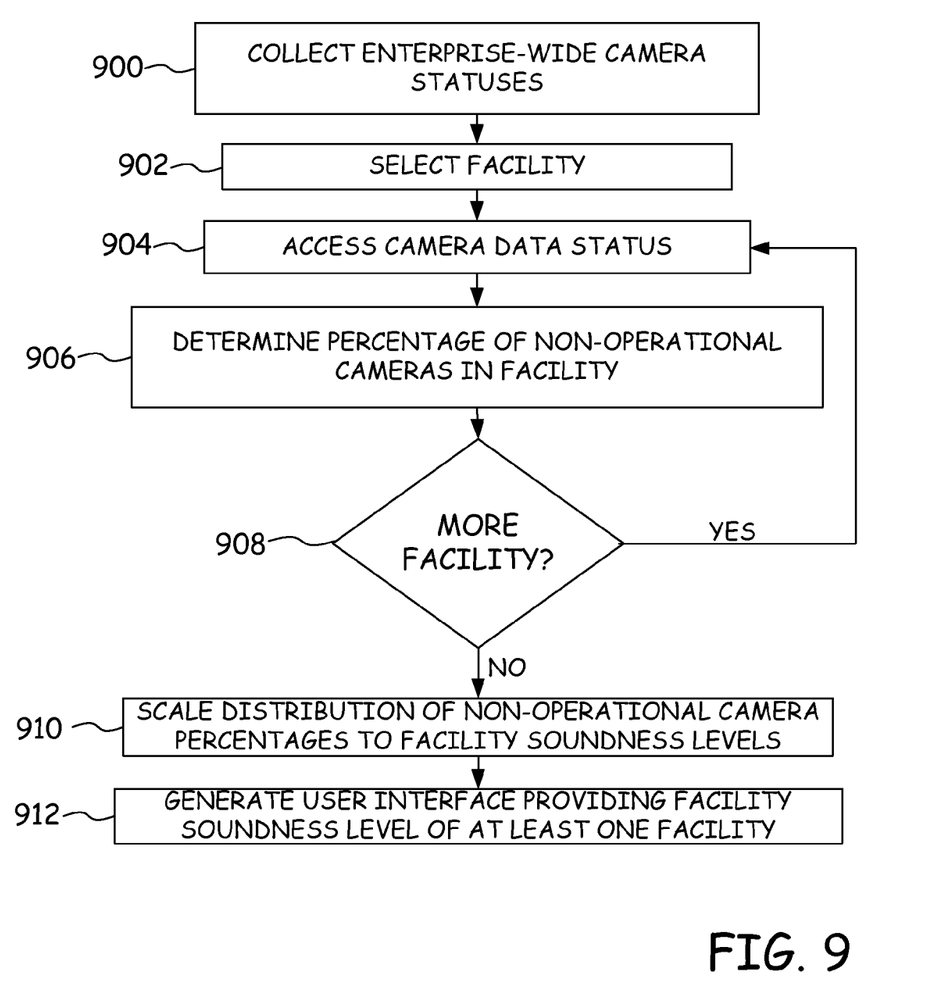
FIG. 9 provides a flow diagram of a method of generating a user interface to indicate facility soundness based on operational statuses of cameras.

FIG. 9 provides a flow diagram of a method for indicating the operational soundness of a facility based on enterprise-wide camera statuses. In step 900, camera testing application 240 collects enterprise-wide camera statuses 242. In accordance with some embodiments, the status of a camera is collected by requesting the status from the camera over a network. At step 902, a facility soundness evaluator 256 selects a facility from a collection of facilities associated with an enterprise. For example, for the enterprise shown in FIG. 2, facility soundness evaluator 256 selects one of the facilities 202, 204, 206 and 208. At step 904, facility soundness evaluator 256 accesses the camera status data for the selected facility. At step 906, facility soundness evaluator 256 determines a measure of the quantity of non-operational cameras in the facility and stores this information for the facility in memory. Thus, the status of each camera in the facility is retrieved from enterprise-wide camera statuses 242 and the measure of the quantity of cameras in the facility that are not operational is determined. The measure of the quantity of cameras in the facility that are not operational can be a count of the non-operational cameras or a percentage of non-operational cameras, for example.

At step 908, facility soundness evaluator 256 determines if there are more facilities in the enterprise. If there are more facilities, the process returns to step 902 and a new facility is selected. Steps 904 and 906 are then repeated for the new facility. When there are no more facilities in the enterprise at step 908, facility soundness evaluator 256 scales the distribution of non-operational camera measures to facility soundness levels.

Figure 10:
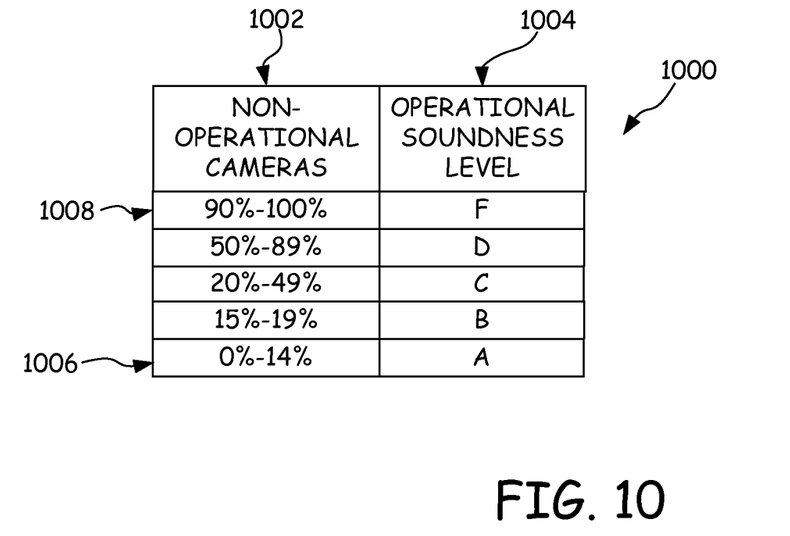
FIG. 10 provides a table of soundness levels for percentages of operational cameras.

FIG. 10 provides an example of how measures of quantities of non-operational cameras can be scaled to operational soundness levels. In FIG. 10, the measure of the quantity of non-operational cameras is the percentages of non-operational cameras, which is shown in column 1002. The percentages of non-operational cameras are scaled to five operational soundness levels A, B, C, D, and F shown in column 1004. As shown in row 1006, facilities that have a non-operational camera percentage within the range of 0-14% are designated as having an operational soundness level of A. As shown in row 1008, facilities with a non-operational camera percentage within the range of 92-100% have an operational soundness level of F.

Figure 11:
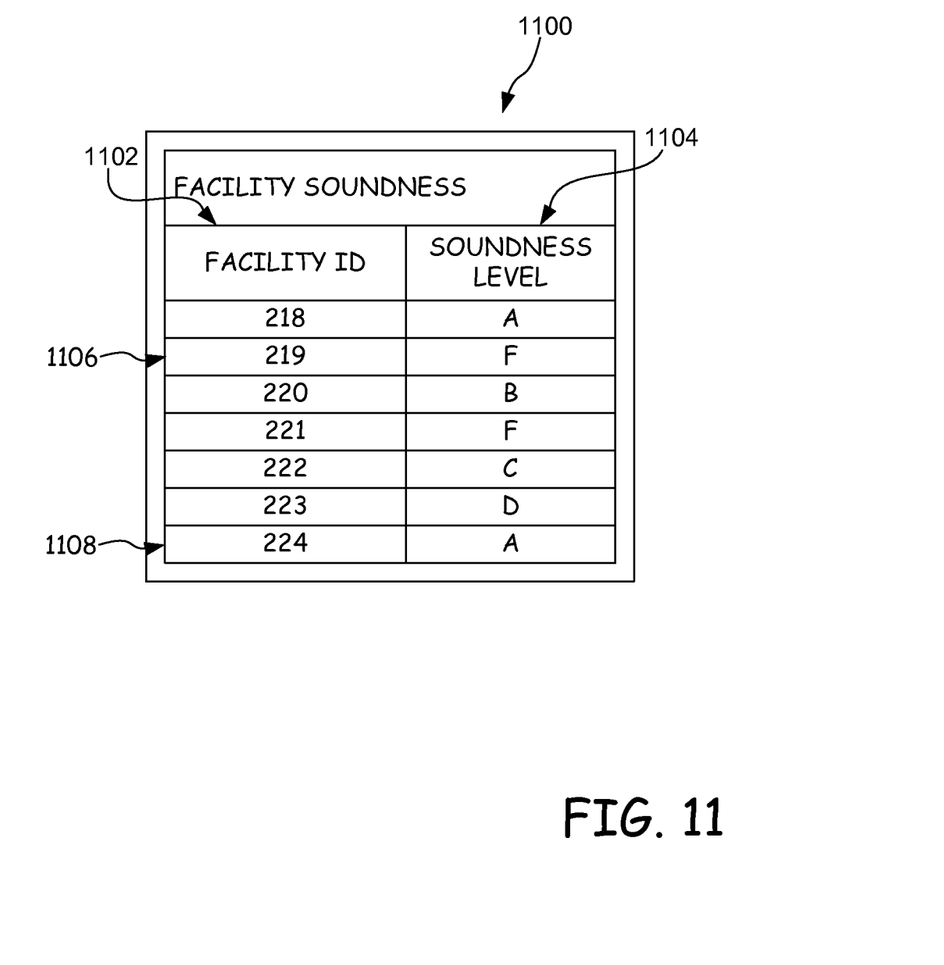
FIG. 11 provides an example of a user interface indicating soundness levels of facilities.

At step 912, facility soundness evaluator 256 generates a facility soundness user interface that provides a facility soundness level of at least one facility. FIG. 11 provides an example of a user interface 1100 providing the soundness levels of a plurality of facilities. In user interface 1100, column 1102 contains facility identifiers (facility IDs) and column 1104 contains operational soundness levels. As shown in row 1106, the facility with facility ID 219 has an operational soundness level of F and as shown in row 1108 the facility with facility ID 224 has an operational soundness level of A.

Thus, by simply examining a measure of the quantity of operational cameras within a facility, a broader assessment of the operational soundness of the facility can be determined and can be provided through a user interface. This follows from the present inventors' recognition that if a store manager is not following protocols to maintain cameras in an operational status they are possibly not following other protocols related to operational soundness and guidelines.

Figure 12:
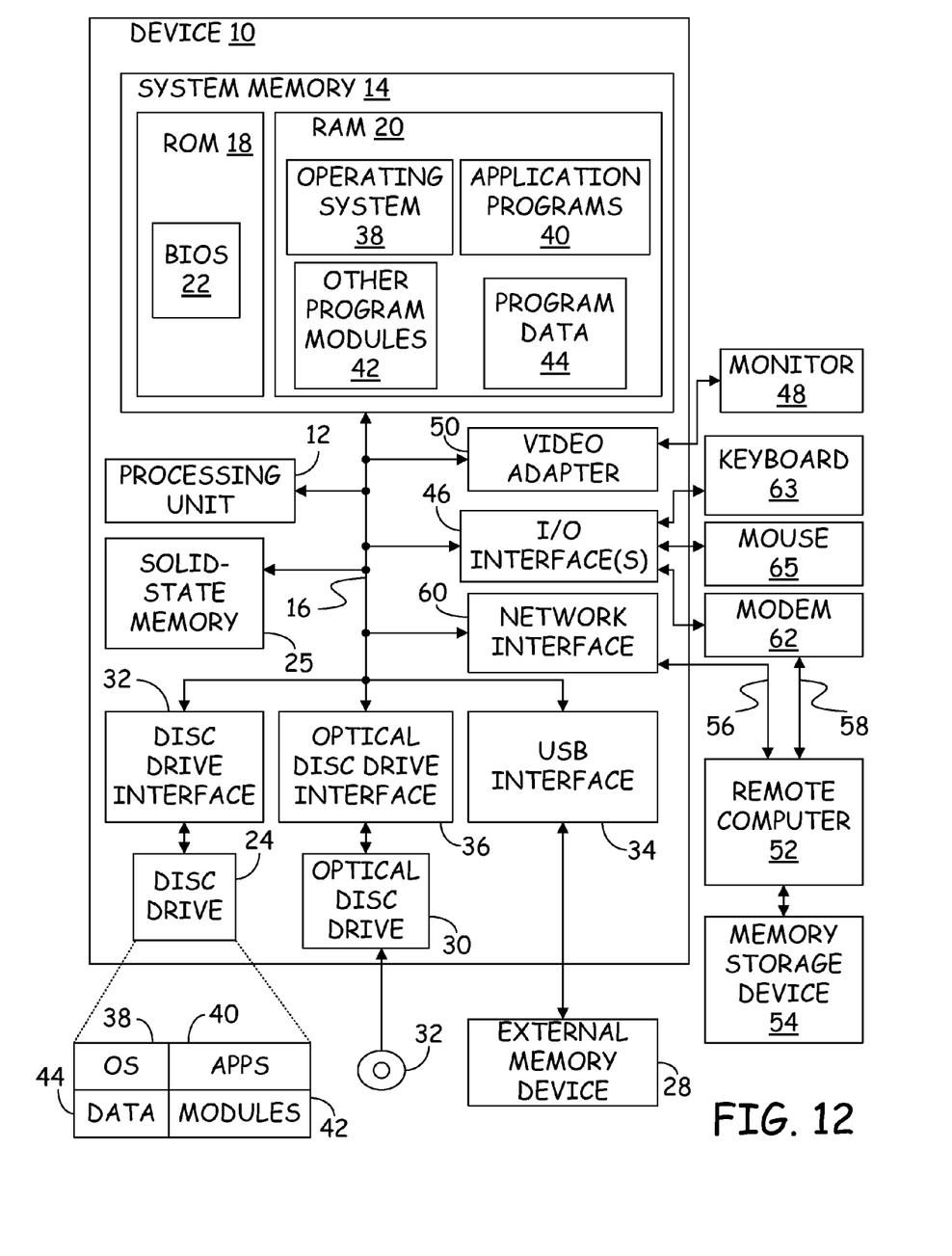
FIG. 12 provides an example of a computing device used with various embodiments.

An example of a computing device that can be used as a server and/or client device in the various embodiments is shown in the block diagram of FIG. 12. The computing device 10 of FIG. 12 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, a solid state memory 25, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives, solid state memory and external memory devices and their associated computer-readable media provide nonvolatile storage media for computing device 10 on which computer-executable instructions and computer-readable data structures may be stored. Other types of media that are readable by a computer may also be used in the exemplary operation environment.

A number of program modules may be stored in the drives, solid state memory 25 and RAM 20, including an operating system 38, one or more application programs 40, other program modules 42 and program data 44. For example, application programs 40 can include instructions representing camera location evaluator 224, heat map generator 228, viewing history application 220, camera settings controller 238, camera testing application 240, camera risk evaluator 244, camera location recommendation application 250, and facility soundness evaluator 256. Program data 44 can include enterprise-wide viewing history 222, location groups 226, 236, and 246, scaled views 227, heat map 230, camera location recommendation user interface 232, enterprise-wide camera statuses 242, facility soundness user interface 1100, high-risk camera locations 248, and camera movement recommendation user interface 252.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

Computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 12. The network connections depicted in FIG. 12 include a local area network (LAN) 56 and a wide area network (WAN) 58. Such network environments are commonplace in the art.

Computing device 10 is connected to the LAN 56 through a network interface 60. Computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 12 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
 requesting a status of each camera in a plurality of facilities;
 receiving and storing by a processor each camera status in memory;
 grouping cameras in different facilities into groups;
 for each group, determining a measure of a quantity of cameras in the group that are not operational based on the status stored for each camera;
 generating a user interface that recommends moving all cameras in a group to a new location in each respective facility if the measure of the quantity of cameras that are not operational in the group exceeds a threshold.

2. The method of claim 1 wherein said grouping cameras in different facilities into groups comprises retrieving a name assigned to each camera and grouping cameras based on the names assigned to the cameras.

3. The method of claim 2 wherein said requesting a status of each camera comprises requesting the status from the camera over a network.

4. The method of claim 1 further comprising:
 determining a measure of a quantity of cameras in a facility that are not operational;
 generating a user interface indicating a soundness of at least one facility based in part on the measure of the quantity of cameras in the facility that are not operational.

5. The method of claim 4 further comprising determining a percentage of cameras that are not operational in the facility and scaling the percentage to a facility soundness level wherein generating a user interface indicating a soundness of the facility comprises generating a user interface comprising the facility soundness level.

6. A computing device comprising:
 a processor requesting a status of each camera in a facility;
 a memory receiving and storing each camera status;
 the processor determining a measure of how many cameras in the facility are not operational;
 the processor generating a user interface indicating an operational soundness of the facility based on the measure of how many cameras in the facility are not operational;
 the processor requesting a status of each camera in a plurality of facilities;
 the processor grouping the cameras into location groups;
 the processor identifying at least one location group with more than a threshold measure of cameras that are not operational; and
 the processor providing a second user interface recommending that cameras in the identified location group be moved from their locations within the facilities.

7. The computing device of claim 6 wherein the processor determining a measure of how many cameras in the facility are not operational comprises the processor determining a percentage of cameras in the facility that are not operational and wherein the processor generating the user interface based on the measure of how many cameras in the facility are not operational comprises the processor generating the user interface based on the percentage of cameras in the facility that are not operational.

8. The computing device of claim 7 further comprising the processor scaling the percentage of cameras in the facility that are not operational to an operational soundness level and a display displaying the operational soundness level in the user interface.

9. The computing device of claim 6 wherein the processor groups the cameras into location groups based on names assigned to the cameras.

10. A computer-implemented method comprising:
 grouping cameras from multiple buildings into groups;

for each group, determining a distribution of time periods between when video is captured by cameras and when it is viewed using viewing histories for each of the cameras in the group; and for each group, setting a cache overwrite time by a processor that designates when a video from a camera in the group may be overwritten in a memory based on the distribution for the group.

11. The computer-implemented method of claim 10 wherein said grouping cameras into groups comprises grouping cameras based in part on areas of buildings covered by the cameras.

12. The computer-implemented method of claim 11 wherein said determining a distribution comprises determining an expected value and a standard deviation for the time period between when video is captured by cameras and when it is viewed.

13. The computer-implemented method of claim 12 wherein said setting a cache overwrite time comprises setting the cache overwrite time to the expected value plus two times the standard deviation.

14. The computer-implemented method of claim 10 further comprising setting a memory size for all cameras in a group based on the distribution for the group.

15. The computer-implemented method of claim 10 wherein said setting a cache overwrite time comprises setting the cache overwrite time in a respective video storage controller in each building.

16. A non-transitory storage medium having computer-executable instructions stored thereon that when executed by a processor cause the processor to perform steps comprising:

grouping cameras from multiple buildings into groups;

for each group, determining an average number of times images from cameras in the group have been viewed over a chosen period of time; and generating a user interface, by a processor, that recommends removing cameras from a location in all of the multiple buildings based on the average number of times images from cameras in a group were viewed over the chosen period of time.

17. The storage medium of claim 16 wherein the user interface recommends removing at least one camera from the location even though images from the camera were viewed at least once over the chosen period of time.

18. The storage medium of claim 16 further comprising displaying, by a processor, a heat map of a building that indicates the relative frequency with which images from various groups of cameras are viewed.

19. The storage medium of claim 18 wherein the heat map comprises color-coded areas, where each color-coded area represents an area covered by cameras in a group of cameras and the color coding of the color-coded area indicates the relative frequency with which images from the group of cameras are viewed.

* * * * *